3,333,001
STABILIZED N,N-DIALKYLHYDROXYLAMINE COMPOSITIONS

Harry E. Albert and Paul Gordon Haines, Lafayette Hill, Pa., assignors to Pennsalt Chemicals Corporation, Philadelphia, Pa., a corporation of Pennsylvania
No Drawing. Filed May 25, 1964, Ser. No. 370,102
8 Claims. (Cl. 260—583)

This invention relates to improved N,N-di-lower alkylhydroxylamine compositions having improved storage stability. More particularly, the invention is concerned with aqueous N,N-di-lower alkylhydroxylamine solutions stabilized against decomposition during storage.

N,N-di-lower alkylhydroxylamines are known to have a variety of uses. For example, they inhibit the polymerization of styrene monomer during transport and storage of styrene prior to its use and they act as shortstops in the preparation of synthetic rubber, such as styrene-butadiene rubber. Further, as disclosed in the application of Harry E. Albert, S.N. 216,764, now U.S. Patent 3,148,225, they inhibit the formation of popcorn polymer which occurs in the recovery systems of synthetic rubber manufacturing plants.

When sold in commerce, the dialkylhydroxylamines are generally made available as concentrated aqueous solutions, usually on the order of 85% by weight. Such solutions are then diluted with water for use. In shortstop applications, for example, the dilute solutions which are added to the polymerization system generally contain on the order of 0.1 to 0.5% by weight of di-lower alkylhydroxylamine. These dilute solutions are made up and then used over a prolonged period of time and it has been observed that the dilute solutions of the di-lower alkylhydroxylamine are not stable to storage. It has now been found by means of this invention, that such dilute aqueous solutions of N,N-di-lower alkylhydroxylamines may be protected against storage instability by adding to the solution a benzothiazole compound of the structure

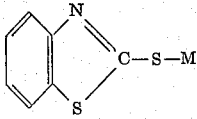

where M is a member selected from the group of hydrogen, alkali metals, and NH—R, where R is a member selected from the group consisting of lower alkyl and cycloalkyl.

A further embodiment of this invention is to provide storage stable concentrated aqueous solutions of N,N-di-lower alkylhydroxylamines containing the above compounds as stabilizers. Such concentrated solutions are useful articles of commerce in that they permit sale of a concentrated solution which, when diluted at the point of use, will provide a storage stable dilute solution.

The N,N-di-lower alkylhydroxylamine solutions which are stabilized in accord with this invention will be those N,N-di-lower alkylhydroxylamines containing from one to six carbon atoms in each alkyl group. These include such compounds as N,N-dimethylhydroxylamine; N-methyl - N - ethylhydroxylamine; N,N-diethylhydroxylamine; N,N-di-n-propylhydroxylamine; N,N-di-n-butylhydroxylamine; N,N-di-isobutylhydroxylamine; N,N-diamylhydroxylamine; N,N-di-n-hexylhydroxylamine; and the like. In the following discussion and examples, N,N-di-ethylhydroxylamine will be used to exemplify the N,N-dialkylhydroxylamines, but it will be understood that the process and the compositions described by this invention are operable with the other members of the class as exemplified above.

The benzothiazole compounds which are useful as stabilizers in this invention will include 2-mercaptobenzothiazole, its alkali metal salts (e.g. the lithium, sodium, potassium, and the like) and sulfenamides of the structure

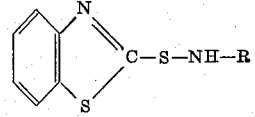

where R is alkyl or cycloalkyl containing preferably from one to six carbon atoms. Compounds within this embodiment of the invention will include N-methyl-2-benzothiazole sulfenamide N-isopropyl-2-benzothiazole sulfenamide, N-t-butyl-2-benzothiazole sulfenamide, N-n-hexyl-2-benzothiazole sulfenamide, N-cyclohexyl-2-benzothiazole sulfenamide and the like.

The amount of benzothiazole compound that will be used as a stabilizer for the hydroxylamine will generally range from about 0.05 to about 5% by weight of the hydroxylamine content of the solution. The preferred range will be between about 0.1% and about 2%.

The following examples will serve to more fully illustrate the nature of the invention.

EXAMPLE 1

To an 87% by weight aqueous solution of N,N-diethylhydroxylamine there is added an amount of 2-mercaptobenzothiazole equal to 0.1% by weight of the N,N-diethylhydroxylamine content of the solution. The solution is stable to storage and shipping and, when used by the rubber manufacturer, is simply diluted with water to reduce the concentration of the N,N-diethylhydroxylamine to about 0.1 to 0.5%, the benzothiazole concentration being reduced accordingly. The dilute solution is then ready for use as a stopping agent for polymerization.

EXAMPLE 2

Evaluation of stabilizers

Evaluation of the stabilizers is accomplished by means of accelerated aging tests which are accomplished by holding treated and untreated solutions at slightly elevated temperatures for a period of time. The method for determining the amount of N,N-diethylhydroxylamine is that based on the procedure described in "Pharmaceutical Analysis" edited by Higuchi and Brockmann-Hanssen, Interscience Publishers, 1961, p. 72, which employs alkaline triphenyltetrazolium chloride for colorimetric analysis. The following tables indicate the conditions used and the results obtained:

TABLE 1.—STABILIZATION OF DILUTE AQUEOUS SOLUTIONS OF N,N-DIETHYLHYDROXYLAMINE (DEHA) WITH VARIOUS BENZOTHIAZOLES

| | Additive (Percent by wt. of DEHA) | Initial Percent DEHA | Hours Solution Held at 35° C. | Percent DEHA After Test |
|---|---|---|---|---|
| A | Blank | 0.47 | 168 | 0.03 |
| | | | 384 | 0.02 |
| | 0.5— 2-mercaptobenzothiazole. | 0.55 | 168 | 0.55 |
| | | | 384 | 0.52 |
| B | Blank | 0.37 | 774 | 0.04 |
| | 0.1% 2-mercaptobenzothiazole. | 0.55 | 774 | 0.50 |
| C | Blank | 0.79 | 1,128 | 0.09 |
| | 0.1% N-cyclohexyl-2-benzothiazole sulfenamide. | 0.97 | 1,128 | 0.83 |

EXAMPLE 3

Evaluation of N-ethyl-2-benzothiazole sulfenamide as in the above example indicates stabilizing effects on a 0.1% aqueous solution of N,N-di-n-hexylhydroxylamine.

EXAMPLE 4

Use of the sodium and potassium salts of 2-mercaptobenzothiazole as in Example 2 shows similar stabilizing effects on N,N-diethylhydroxylamine solutions.

It will be understood that numerous changes and variations may be made from the above description and examples without departing from the spirit and scope of the invention.

What is claimed is:

1. Aqueous solutions of N,N-di-lower alkylhydroxylamines having storage stability consisting essentially of water, an N,N-di-lower alkylhydroxylamine, and a stabilizing amount of a compound of the structure

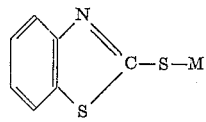

where M is selected from the group consisting of hydrogen, alkali metal, and NH—R, wherein R is a member selected from the group consisting of alkyl and cycloalkyl containing from one to six carbon atoms.

2. A solution as in claim 1 wherein the hydroxylamine is N,N-diethylhydroxylamine.

3. A solution as in claim 1 wherein the hydroxylamine is N,N-diethylhydroxylamine and the stabilizer is N-cyclohexyl-2-benzothiazole sulfenamide.

4. A solution as in claim 1 wherein the hydroxylamine is N,N-diethylhydroxylamine and the stabilizer is 2-mercaptobenzothiazole.

5. A solution as in claim 1 wherein the hydroxylamine is N,N-diethylhydroxylamine and the stabilizer is the sodium salt of 2-mercaptobenzothiazole.

6. A process for inhibiting the decomposition of aqueous solutions of N,N-di-lower alkylhydroxylamines which comprises adding to said aqueous solution a stabilizing amount of a compound of the structure

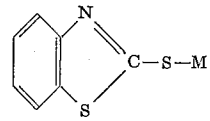

where M is selected from a group consisting of hydrogen, alkali metals and NH—R wherein R is selected from the group consisting of alkyl and cycloalkyl containing from one to six carbon atoms.

7. An aqueous solution comprising at least about 85% by weight of an N,N-di-lower alkylhydroxylamine and from about 0.05% to about 5% by weight of 2-mercaptobenzothiazole as a stabilizer.

8. An aqueous solution as in claim 7 wherein the hydroxylamine is N,N-diethylhydroxylamine.

References Cited
UNITED STATES PATENTS 3,288,748   11/1966   Cyba _____ 260—45.85 X CHARLES B. PARKER, *Primary Examiner.*

R. L. RAYMOND, *Assistant Examiner.*